S. PRESTWICH.
SELF LUBRICATING BEARING.
APPLICATION FILED OCT. 16, 1917.

1,357,420.

Patented Nov. 2, 1920.

*INVENTOR*
Sydney Prestwich
BY Brockett and Hyde
*ATTORNEYS.*

UNITED STATES PATENT OFFICE.

SYDNEY PRESTWICH, OF CINCINNATI, OHIO, ASSIGNOR TO THE AMERICAN LAUNDRY MACHINERY COMPANY, OF NORWOOD, OHIO, A CORPORATION OF OHIO.

SELF-LUBRICATING BEARING.

1,357,420.          Specification of Letters Patent.          Patented Nov. 2, 1920.

Application filed October 16, 1917. Serial No. 196,828.

*To all whom it may concern:*

Be it known that I, SYDNEY PRESTWICH, citizen of the United States, residing at Cincinnati, in the county of Hamilton and State of Ohio, have invented certain new and useful Improvements in Self-Lubricating Bearings, of which the following is a specification.

This invention relates to self lubricating bearings and more particularly to bearings for vertical shafts, especially such as are found in extractors or like machines where the bottom bearing floats or has a certain amount of lateral movement.

The object of the invention is to provide an improved bearing for a vertical shaft which permits lateral movement of said shaft and at the same time provides thorough lubrication for all of the rotating parts.

A further object of the invention is to provide means for utilizing the rotation of the shaft to produce positive lubrication of the rotating parts, and to also enable the lubricant to be renewed from time to time, as may be desirable, without disassembling the apparatus.

Further objects of the invention are in part obvious and in part will appear more in detail hereinafter.

The invention comprises the lubricating bearing hereinafter described and claimed.

Figure 1:
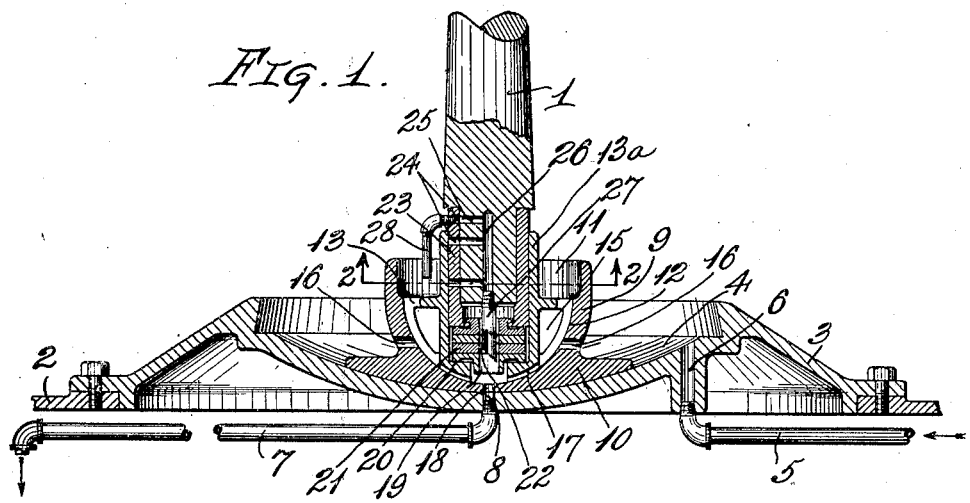
Figure 2:
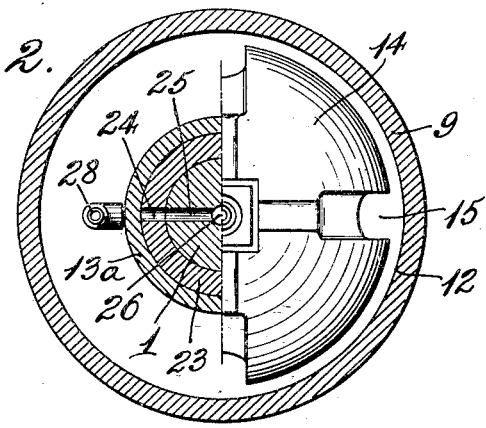

In the drawings, Figure 1 is a central elevation illustrating a bearing embodying the invention, and Fig. 2 is in part a sectional plan view on the line 2—2, Fig. 1, looking in the direction of the arrows, and in part a bottom plan view of one of the bearing members.

In the drawings 1 represents the vertical rotating shaft which may be any shaft of any machine or mechanism but as shown is the vertical shaft of an extractor of the type shown in my copending application filed of even date herewith, Serial No. 196,827, to which reference may be had for a more complete description of said extractor.

2 represents the stationary part which supports the load and thrust of the shaft 1 and the various parts carried thereby, for example, member 2 may be a portion of the curb or outer casing of the extractor of my copending application referred to. On said support is mounted a seat member 3 in the form of a shallow tray or dish having an upper concave seat surface 4. 5 indicates a supply pipe for lubricant, such as oil, which flows through a channel 6 and is delivered to the upper portion of the seat 4. 7 indicates a drain pipe for the lubricant, which communicates through a port 8 with the lower portion or bottom of the seat 4.

On the seat is mounted a cup member 9 having a wide bottom portion 10 whose lower surface is curved to correspond with the curvature of the seat surface 4. Both of these surfaces are spherical. Cup member 9 is hollow, its upper end being provided with a large opening 11, while its inner wall or surface 12 is semi-spherical, but curved on a radius of curvature shorter than that of the seat 4. Upon this inner wall or surface 12 rests an abutment member 13, whose lower portion has a semi-spherical convex surface 14 to correspond with the surface 12, and whose central portion is in the form of a hollow sleeve 13ª to receive the lower end of the shaft. The semi-spherical surface 14 is provided with several recesses 15 lying opposite ports or openings 16 in the wall of cup member 9 and communicating with channels 17 leading down to the bottom of member 9, which is provided with a small port or opening 18 communicating with port 8 in the seat member 3.

The central opening 19 in the bottom of abutment 13 is of smaller diameter than the inner diameter of the sleeve 13ª, forming shoulders or abutments 20 upon which are mounted a series of anti-friction members, such as disks 21. The latter may be of hardened steel or may be alternatively hardened steel and fiber as desired. Said disks are preferably also perforated at their centers to provide a central channel 22. Upon the upper disk is mounted a sleeve 23 which has a driving fit upon the reduced lower end of shaft 1 and turns within the sleeve 13ª. In said sleeve 23 are one or several radial ports 24 communicating with alined ports 25 in the shaft, all of said ports 25 communicating with an axial passage 26 which in turn is connected at its lower end to a short pipe or conduit 27, lying in the channel 22. To the upper port 24 in sleeve 23 is connected a short pipe 28 whose outer end portion extends downwardly and lies within the outer wall of member 9.

In operation the outlet from the drain 7 is closed and a suitable quantity of lubricant is allowed to flow through the pipe 5 and collect upon the seat 4 up to the level of the oil feeding ports 16 or above the same. When the shaft 1 rotates the pipe 28 travels around therewith and centrifugal force acting outwardly upon the lubricant draws the latter up through the central opening 22 and through pipe 27 and passage 26 so as to discharge the same in a continuous stream from the pipe 28. This produces a constant head or pressure of lubricant in the passage 26 causing a continuous flow through the ports 25 and 24 to lubricate the bearing surfaces between sleeves 13ª and 23. The oil also flows entirely around and over the friction disks and to both sets of the spherical bearing surfaces. Periodically the lubricant can be drained out through pipe 7 and replenished through pipe 5 without taking the machine apart or disassembling the bearing.

What I claim is:—

1. In combination, a support, a seat member carried thereby and provided with a downwardly extending opening terminating in a concave seat surface, means for supplying oil to said opening, a cup shaped member having a bottom portion adapted to engage the concave surface and provided with an opening terminating in a semi-spherical surface, said cup shaped member having ports establishing communication between the opening in the seat member and the semi-spherical opening in the cup member, a semi-spherical abutment member engaging in the opening in the cup member, said abutment member being provided with channels in its periphery leading to the center thereof, a bearing sleeve carried by said abutment member and axially arranged with respect thereto, and a shaft mounted in said bearing member and provided with a centrally disposed oil opening extending above the sleeve, said shaft being provided with radially disposed openings one leading from the oil opening to the bearing and the other leading out above the bearing.

2. In combination, a support, a bearing carried by said support, a vertical shaft engaging in said bearing and having an oil supply opening and a radially disposed opening leading to the bearing, and means for maintaining a constant level of lubricant above said radially disposed opening.

3. In combination, a support, a bearing carried by said support, a vertical shaft having a bearing portion engaging in said bearing and also having an oil supply opening, and radially disposed discharge openings leading to the bearing and to a point above the bearing for maintaining a constant level of lubricant above said radially disposed opening leading to the bearing.

4. In combination, a support, a bearing carried by said support, a vertical shaft having a bearing portion engaging in said bearing and also having an oil supply opening, radially disposed discharge openings leading to the bearing and to a point above the bearing for maintaining a constant level of lubricant above said radially disposed opening leading to the bearing, and means for directing the discharge of oil from the opening above the bearing downward.

5. In combination, a support, a bearing carried by said support, a vertical shaft provided with a central opening and two radially disposed ports one leading to the bearing and one leading out above the bearing, and means for supplying lubricant to the central opening in said shaft.

6. In combination, a support, a vertically disposed bearing carried thereby, an oil well in the bottom of said bearing, a vertically disposed shaft engaging in said bearing and provided with an axially disposed opening in its lower end to form an oil supply, and discharge openings communicating therewith one of said openings leading to the bearing and the other leading out above the bearing, a tube connected in said axially disposed opening of the shaft and extending into the oil well, and means for directing the oil from the opening leading out above the bearing downward.

In testimony whereof I affix my signature.

SYDNEY PRESTWICH.